R. A. LEAVELL.
GASOLENE FEED SYSTEM FOR CARBURETERS.
APPLICATION FILED SEPT. 3, 1914. RENEWED DEC. 26, 1918.

1,310,915.

Patented July 22, 1919.

Witnesses:
Frederick S. Pierce
John H. Dennis

Inventor:
Richard A. Leavell
By Brown, Hanson & Boettcher
Attorneys

R. A. LEAVELL.
GASOLENE FEED SYSTEM FOR CARBURETERS.
APPLICATION FILED SEPT. 3, 1914. RENEWED DEC. 26, 1918.
1,310,915.
Patented July 22, 1919.
2 SHEETS—SHEET 2.
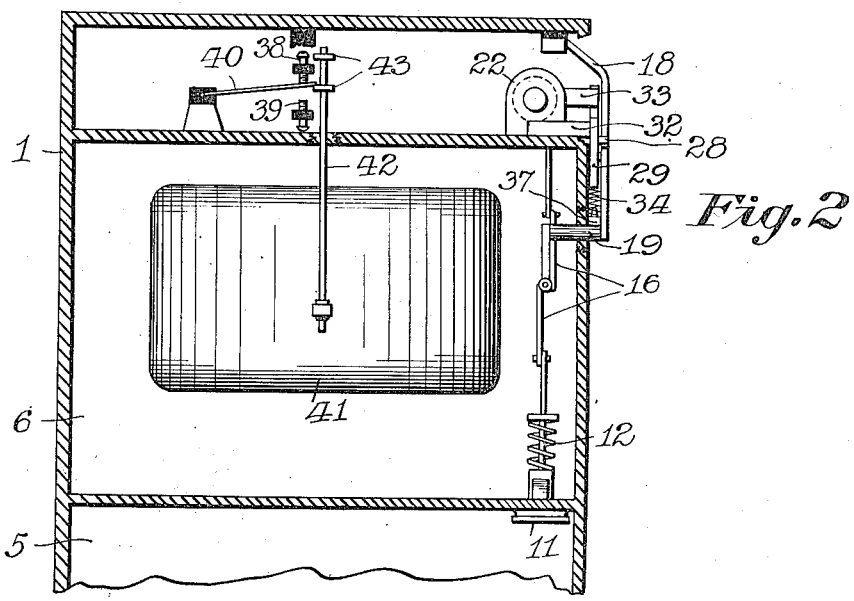
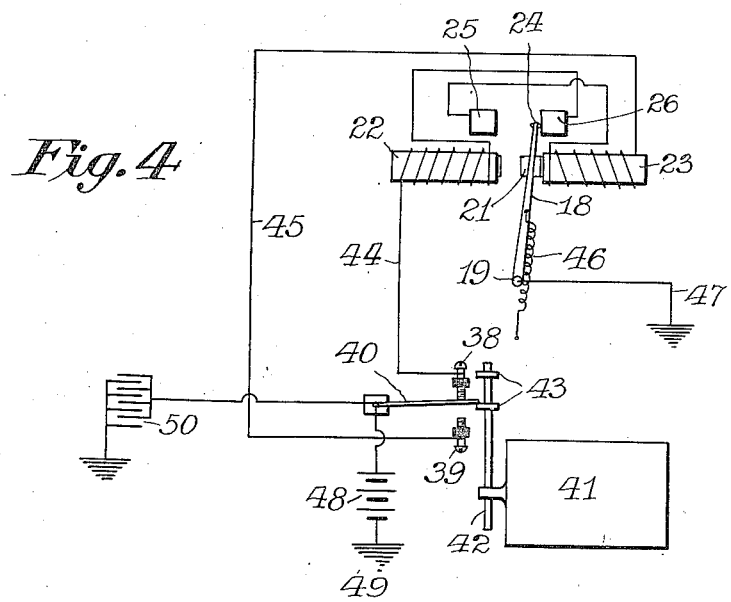
Witnesses:
Frederick L. Pierce
John A. Dienner
Inventor:
Richard A. Leavell
By Brown, Hanson & Boettcher
Attorneys

UNITED STATES PATENT OFFICE.

RICHARD A. LEAVELL, OF CHICAGO, ILLINOIS, ASSIGNOR OF ONE-HALF TO STROMBERG MOTOR DEVICES COMPANY, OF CHICAGO, ILLINOIS, A CORPORATION OF ILLINOIS.

GASOLENE-FEED SYSTEM FOR CARBURETERS.

1,310,915.      Specification of Letters Patent.      Patented July 22, 1919.

Application filed September 3, 1914, Serial No. 860,006. Renewed December 26, 1918. Serial No. 268,416.

*To all whom it may concern:*

Be it known that I, RICHARD A. LEAVELL, a citizen of the United States, residing at Chicago, in the county of Cook and State of Illinois, have invented certain new and useful Improvements in Gasolene-Feed Systems for Carbureters, of which the following is a full, clear, concise, and exact description, reference being had to the accompanying drawings, forming a part of this specification.

The subject matter of this invention is a gasolene feed system for carbureters.

Gravity feed of gasolene to the carbureter of an automobile engine is often unsatisfactory, due to the design of the vehicle, the different inclinations upon which it may be placed under running conditions, and due to the differences in head of the oil supply which may occur.

Pressure fed systems have not generally been satisfactory, due to the greater danger of leakage, as well as the necessity of first pumping up the pressure in the tank and of maintaining an air tight filling cap and connections.

Suction systems are not subject to the difficulties above mentioned, but have, as heretofore constructed, been subject to a lack of positiveness of action of the controlling mechanism therefor.

It is an object of the present invention to provide a suction system which will be positive in action, and which will change quickly and positively from one condition of operation to another.

Instead of controlling the valves necessary for operation directly by means of floats, I employ electromagnets for performing this work. It is then necessary for the float mechanism to control only comparatively light contact springs. This tends to produce ease and certainty of action, and allows the control mechanism to be located at any desired point, though I prefer to place the auxiliary chamber and the control mechanism immediately above and forming a continuation of the carbureter float chamber.

In the accompanying drawings—

Fig. 2 is an elevation partly in section taken at right angles to Fig. 1;

Fig. 4 is a diagram of the electrical connections employed.

Figure 1:
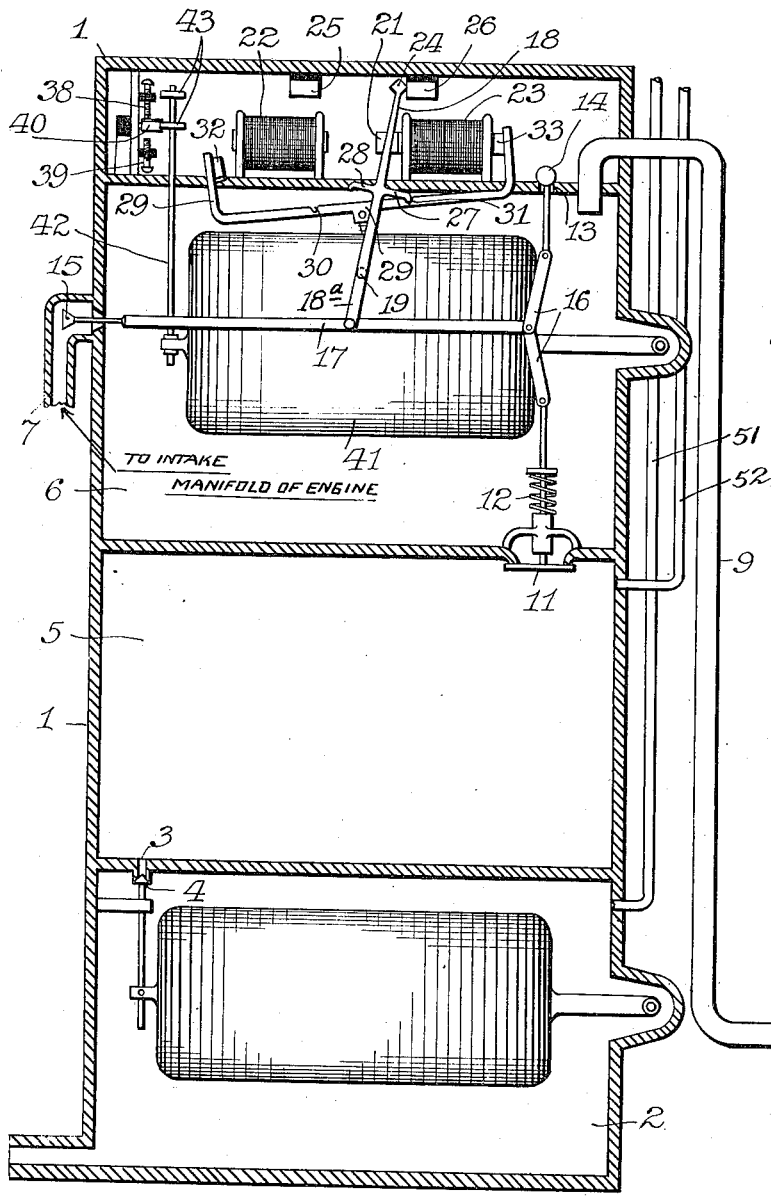
Figure 1 is an elevation with parts broken away of a device embodying my invention.

I have shown in Fig. 1 a compound float chamber and feeding means with the control means shown at the top of the figure for governing the rate at which the gasolene is drawn into the suction chamber. The casing 1 is formed with a plurality of compartments, the bottom one of which, in this case, is shown as the float chamber of the carbureter itself. This chamber 2 is connected by means of a passageway 3, and a float controlled valve 4 with the reservoir 5, shown in this case immediately above the float chamber.

The suction chamber 6 is connected by the pipe 7 to the intake manifold of the engine. This suction chamber 6 is also connected to the gasolene tank 8 by means of the pipe 9. The suction chamber is also connected with the reservoir 5 by means of the valve 11, which is provided with a spring 12, tending normally to close the valve. The valve 11 connects the suction chamber with the intermediate chamber 5. This valve opens by downward movement against the opposition of the spring 12 which normally tends to hold it closed. The suction chamber is also provided with a passage 13, which is normally held closed by a ball valve, or the like, 14, which, when opened, forms a vent for the suction chamber allowing the air to enter to break the partial vacuum, and thus to prevent more liquid fuel from being discharged into the suction chamber.

A valve 15 controls the connection of the suction pipe 7 with the chamber 6, in order to shut off the connection with the manifold when the vent 13 is open. This aids both in preventing disturbance in the normal mixture in the manifold and in breaking the vacuum quickly in the chamber 6. The valves 11 and 14 are connected by means of a toggle joint 16. The spring 12, tends normally to maintain the toggle in the broken position. The valve 15 is connected to the toggle by means of the bar 17, so that all three of the valves are operated at the same time.

A lever 18, pivoted at 19, is connected by an arm 18ᵃ to the bar 17. The lever 18 carries an armature 21, which may be attracted by either one of the electromagnets 22 and 23. The lever 18 bears at its upper end a contact 24, which may bear upon the stationary contacts 25 and 26 mounted on the casing 1. The lever 18 is provided with a pair of extending detent members 27 and 28.

Figure 3:
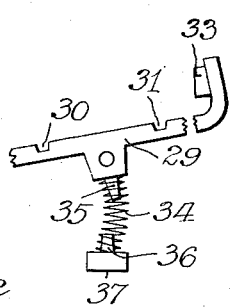
Fig. 3 is a fragmentary detail view of the latch shown in Figs. 1 and 2.

A pivoted latch 29 is provided with notches 30 and 31 shown more clearly in Fig. 3 and armatures 32 and 33 which are attracted by the electromagnets 22 and 23. The latch 29 is held by a spring 34 which surrounds the pin 35 fastened to the latch member 29 and the pin 36 mounted on a lug 37 forming part of the casing 1.

It can be seen that this spring operates as a toggle joint tending always to maintain the latch member 29 in one of its extreme positions, thus effectually holding the lever 18 against movement until the latch is unfastened by the attraction of one of the electromagnets to release it.

The circuit for energizing the electromagnets is determined by a pair of stationary contacts 38 and 39, and a spring contact 40. The spring contact is moved by the float 41 which has a rod 42 provided with collars 43 for engaging the spring 40. As the float rises, due to a rise of level in the suction chamber, the contact 40 is moved into engagement with the stationary contact 38, and the electromagnets are operated to shut off the suction pipe 7 to open the vent port 13, and the discharge valve 11, allowing the liquid to flow into the reservoir 5.

In Fig. 4 I have shown a diagram of the circuits employed for obtaining this action. The contact 38 is connected by the wire 44 to the magnet 22, the opposite end of the magnet being connected to the stationary contact 26. The lower contact 39 is connected to the electromagnet 23 by the wire 45, the opposite end of the magnet 23 being connected with the stationary contact 25.

The armature 18, shown in this case as biased by means of the spring 46 to obtain a snap action, is connected to the frame of the vehicle shown as ground by means of the wire 47, the battery 48 being also connected to the frame, as shown at 49.

A condenser 50 is connected between the spring 40 and ground in order to reduce sparking at the contacts 38, 39 and 40.

The operation of the device is as follows: When the parts are in the position shown in the figures, the suction pipe 7 is open to the intake manifold of the engine. The air in the chamber 6 flows out and gasolene or other liquid fuel is forced by the pressure of the atmosphere to fill the tube 9 and to discharge into the suction chamber. This continues until the float 41 rises to such a point that the lower collar 43 causes the spring 40 to engage the upper contact 38 and close the circuit from the battery through the contacts 40, 38, through the electromagnet 22, contacts 26, 24, to ground, thus energizing the magnet 22. The latch member 29 is swung about its pivot by the attraction of armature 32. This releases the detent 27 which has been in engagement with the notch 31, and the armature 21 with the lever 18 is swung to the left, breaking contact at 26 and making contact at 25. This movement of the lever opens the valves 14 and 11 and closes the valve 15 to the suction pipe. As a consequence, the liquid in the chamber 6 is discharged in the reservoir 5, this operation being facilitated by the port 13. As soon as the level of the liquid has fallen sufficiently to bring the contact 40 into engagement with the lower contact 39, the electromagnet 23 is energized, the latch 29 is released, the armature lever 18 is thrown to the right, as shown in the figures, and the valves 11 and 14 are closed, while the valve 15 is open. This cycle is repeated according to the demands of the carbureter float chamber, shown at the bottom of Fig. 1.

In case the reservoir 5 becomes completely filled no more liquid fuel will be drawn after the float 41 has been raised to its upper position as the valve 15 will be closed until the level again falls. The chambers 2 and 5 are open to the atmosphere by means of vents 51 and 52 respectively reaching above the level of the liquid in the chamber 6, in order to facilitate the transfer of the liquid from one chamber to another.

What I claim is:

1. In combination, a chamber, a supply pipe for supplying liquid to said chamber, a normally closed valve through which the liquid is discharged from said chamber, electromagnetic means for operating said valve, a float subject to the level of the liquid in said chamber for controlling said electromagnet means and a separate inlet pipe for supplying liquid to said chamber said inlet being controlled to pass liquid in a single direction into said chamber.

2. In combination, a suction chamber, a supply pipe for supplying liquid from a lower level to said suction chamber, said pipe opening into the top of said chamber, a normally closed valve through which the liquid is discharged from said chamber, a pair of contacts, electromagnetic means controlled by said contacts for operating said valve, a float operated by the level of the liquid in said chamber for controlling said contacts, said valve being opened intermittently to discharge by gravity a charge of liquid from said chamber.

3. In combination, a closed suction chamber, a suction pipe connected thereto, a supply pipe opening into the top of the chamber for supplying liquid to said chamber, a normally closed valve controlling said suction pipe, electromagnetic means for operating said valve, a float controlling said electromagnetic means, said chamber having a separate discharge port and a valve for said discharge port, said valve being operatively connected with said suction controlling valve.

4. In combination, a closed suction chamber, a liquid supply pipe connected thereto, said pipe discharging into the top of said chamber, a suction pipe communicating with said chamber, a valve controlling said suction pipe, a relief valve for said suction chamber, a float in said chamber, contacts controlled by said float and electromagnetic means controlled by said contacts for operating said valve and said relief valve, said chamber having a separate discharge port for discharging the liquid by gravity.

5. In combination, a closed suction chamber, a liquid supply pipe connected thereto, a suction pipe communicating with said chamber, a discharge valve for said chamber, a relief valve for said chamber, a float in said chamber, contacts controlled by said float, and electromagnetic means controlled by said contacts for operating said discharge valve and said relief valve.

6. In combination, a closed suction chamber, a liquid supply pipe connected thereto, a suction pipe communicating with said chamber, a valve controlling said suction pipe, a discharge valve for said chamber, a relief valve for said chamber, a float in said chamber, contacts controlled by said float, and electromagnetic means controlled by said contacts for closing said suction controlling valve and for opening said discharge valve, and said relief valve.

7. In combination, a chamber, means for supplying liquid to said chamber, a float in said chamber, a normally closed valve in the bottom of the chamber, a pair of contacts controlled by said float, a lever for operating said valve, said lever having a plurality of positions, magnets controlled by said contacts for operating said lever, spring means for holding said lever in either of said positions and a relief valve controlled by said electromagnets simultaneously with said normally closed discharge valve.

8. In combination, a chamber, means for supplying liquid to said chamber, a float in said chamber, a valve, a pair of contacts controlled by said float, a lever for operating said valve, magnets controlled by said contacts for moving said lever to either of two alternate positions, a latch operated by said electromagnets for engagement with said lever to hold the same in both operated positions.

9. In combination, a chamber, a discharge valve in the bottom of said chamber, means for supplying liquid to said chamber, a lever for operating said discharge valve, an electromagnet for moving said lever to open said valve, a second electromagnet for moving said lever to close said discharge valve, a latch for holding said lever, a pair of contacts for controlling said magnets, and a float operated by the level of the liquid in said chamber for operating said contacts.

10. In combination, a closed suction chamber, a suction pipe communicating therewith, a valve controlling said suction pipe, means for supplying liquid to said chamber, a lever for operating said valve, an electromagnet for moving said lever to open said valve, a second electromagnet for operating said lever to close said valve, spring held latch means for engaging said lever, a pair of contacts for controlling said magnets, and a float in said chamber operated in accordance with the level of the liquid therein for operating said contacts.

11. In combination, a chamber, a discharge valve for said chamber, a suction pipe communicating with said chamber, a valve for said suction pipe, means for supplying liquid to said chamber, a lever for operating said discharge valve and said suction controlling valve, an electromagnet for moving said lever to open said suction valve and to close said discharge valve, a pair of contacts controlling the circuit of said magnet, and a float controlled by the level of the liquid in said chamber for operating said contacts.

12. In combination, a chamber, a discharge valve for said chamber, means for supplying liquid to said chamber, a suction pipe connected to said chamber, a valve for said suction pipe, a lever for operating said valves, an electromagnet for moving said lever, a latch for holding said lever, a pair of contacts controlling the circuit of said magnet, a float controlled by the level of the liquid in said chamber for operating said contacts, and a pair of contacts controlled by said lever for charging the circuit of said electromagnet.

13. In combination, a pair of magnets, a valve, an armature lever for said magnets, a pair of contacts for inclusion in a circuit by said armature lever adjacent to each electromagnet, each of said magnets having one terminal connected to one of the said contacts, a pair of stationary contacts, each connected to the opposite terminal of said magnets, a contact movable to engage each of said stationary contacts, a float for moving said movable contact, a battery for supplying energy to each of said magnets, and spring means for imparting a snap action to said armature lever.

14. In combination, a pair of electromagnets, an armature lever, a valve controlled by said armature lever, a float, a switch controlled by said float for closing the circuit of one of said magnets, a contact controlled by the movement of said lever for changing the circuit connections and a latch for holding said armature lever in actuated position.

15. In combination, a suction chamber, a suction pipe connected thereto, means for supplying liquid to said suction chamber, a reservoir, a discharge valve between said reservoir and said suction chamber, a float in said suction chamber, contacts operated by said float, a lever for operating said discharge valve, and an electromagnet for moving said lever, said electromagnet controlled by said contacts.

16. In combination, a carbureter float chamber, a reservoir connected therewith, a float controlled valve controlling said connection, a suction chamber connected to said reservoir, a normally closed discharge valve controlling said connection, means for supplying liquid to said suction chamber, a float in said suction chamber, contacts controlled by said float, and electromagnets for operating said discharge valve, said magnets controlled by said contacts, said parts being so organized as to permit the liquid to pass through said discharge valve by gravity.

In witness whereof, I hereunto subscribe my name this 31st day of August, A. D. 1914.

RICHARD A. LEAVELL.

Witnesses:
   JOHN A. DIENNER,
   CAMERON A. WHITSETT.